United States Patent
Benipal et al.

(10) Patent No.: US 9,381,446 B2
(45) Date of Patent: Jul. 5, 2016

(54) SYSTEM FOR DEAERATION IN A FLASH VESSEL

(75) Inventors: Rupinder Singh Benipal, Houston, TX (US); George Morris Gulko, Houston, TX (US); John Saunders Stevenson, Yorba Linda, CA (US); Srikanth Konda, Bangalore (IN); Vishal Rugnathbhai Brahmbhatt, Houston, TX (US)

(73) Assignee: General Electric Company, Schenectady, NY (US)

( * ) Notice: Subject to any disclaimer, the term of this patent is extended or adjusted under 35 U.S.C. 154(b) by 820 days.

(21) Appl. No.: 13/353,208

(22) Filed: Jan. 18, 2012

(65) Prior Publication Data

US 2013/0183204 A1    Jul. 18, 2013

(51) Int. Cl.
*B01D 53/14* (2006.01)
*B01D 3/06* (2006.01)
*B01D 19/00* (2006.01)
(Continued)

(52) U.S. Cl.
CPC *B01D 3/06* (2013.01); *B01D 3/065* (2013.01); *B01D 19/0036* (2013.01); *C10J 3/526* (2013.01); *C10J 3/723* (2013.01); *C10J 3/84* (2013.01); *C02F 1/20* (2013.01); *C02F 2103/18* (2013.01); *C02F 2103/365* (2013.01); *C10J 2300/093* (2013.01); *C10J 2300/0906* (2013.01); *C10J 2300/0916* (2013.01); *C10J 2300/0946* (2013.01); *C10J 2300/0959* (2013.01); *C10J 2300/0976* (2013.01); *C10J 2300/169* (2013.01); *Y02E 20/16* (2013.01); *Y02E 20/18* (2013.01)

(58) Field of Classification Search
CPC .................... B01D 53/46; Y02E 10/00
See application file for complete search history.

(56) References Cited

U.S. PATENT DOCUMENTS

| 4,134,740 A | 1/1979 | Marion et al. |
| 4,141,696 A * | 2/1979 | Marion et al. ............ 48/197 R |

(Continued)

FOREIGN PATENT DOCUMENTS

| CN | 201232032 Y | 5/2009 |
| CN | 201240966 Y | 5/2009 |

(Continued)

OTHER PUBLICATIONS

Search Report and Written Opinion from corresponding EP Application No. 13151662.7.1361 dated Apr. 3, 2013.

(Continued)

*Primary Examiner* — Duane Smith
*Assistant Examiner* — Phillip Shao
(74) *Attorney, Agent, or Firm* — Fletcher Yoder, P.C.

(57) ABSTRACT

The disclosed embodiments relate to systems for deaerating a stream of slag sump water produced by a gasifier. For example, in one embodiment, a system includes a flash vessel having a first inlet configured to introduce a first fluid into the flash vessel, wherein the flash vessel is configured to flash the first fluid to produce a first flash gas, a second inlet configured to introduce a stream from slag sump into the flash vessel, wherein the stream from slag sump comprises a mixture of a gasification fine slag, dissolved oxygen ($O_2$), and water. A gas-liquid contactor in the flash vessel is configured to contact the stream from slag sump with the first flash gas to enable the first flash gas to deaerate the stream from slag sump. A first outlet of the vessel is configured to output an overhead discharge comprising the first flash gas and oxygen from the stream from slag sump.

24 Claims, 5 Drawing Sheets

(51) Int. Cl.
*C10J 3/84* (2006.01)
*C10J 3/72* (2006.01)
*C10J 3/52* (2006.01)
*C02F 1/20* (2006.01)
*C02F 103/18* (2006.01)
*C02F 103/36* (2006.01)

(56) References Cited

U.S. PATENT DOCUMENTS

| | | | |
|---|---|---|---|
| 4,502,869 A | 3/1985 | Jahnke et al. | |
| 4,559,061 A | 12/1985 | Jahnke et al. | |
| 4,778,483 A | 10/1988 | Martin et al. | |
| 4,876,987 A | 10/1989 | Martin et al. | |
| 4,936,376 A | 6/1990 | Martin et al. | |
| 5,233,943 A | 8/1993 | Martin et al. | |
| 5,647,876 A | 7/1997 | Winter et al. | |
| 5,866,091 A | 2/1999 | Stevenson et al. | |
| 6,086,722 A | 7/2000 | Webster, Jr. et al. | |
| 6,269,286 B1 | 7/2001 | Tse et al. | |
| 6,290,857 B1 | 9/2001 | Brahmbhatt et al. | |
| 6,413,418 B2 | 7/2002 | Brahmbhatt et al. | |
| 6,964,696 B2 * | 11/2005 | Malatak et al. | 95/163 |
| 7,300,498 B2 | 11/2007 | Brahmbhatt | |
| 7,846,226 B2 | 12/2010 | Leininger et al. | |
| 2006/0089519 A1 | 4/2006 | Stell et al. | |
| 2008/0145156 A1 | 6/2008 | Livingood et al. | |
| 2008/0235064 A1 | 9/2008 | Gulko et al. | |
| 2009/0107046 A1 | 4/2009 | Leininger et al. | |
| 2009/0158664 A1 | 6/2009 | Kim et al. | |
| 2009/0178338 A1 | 7/2009 | Leininger et al. | |
| 2009/0199474 A1 | 8/2009 | Leininger et al. | |
| 2009/0202403 A1 | 8/2009 | Jimenez-Huyke et al. | |
| 2009/0272821 A1 | 11/2009 | Guo et al. | |
| 2009/0272822 A1 | 11/2009 | Davis et al. | |
| 2010/0251613 A1 | 10/2010 | Thacker et al. | |
| 2010/0293918 A1 | 11/2010 | Gulko et al. | |
| 2010/0324156 A1 | 12/2010 | Winter et al. | |
| 2011/0016787 A1 | 1/2011 | Dinu et al. | |
| 2011/0016788 A1 | 1/2011 | Thacker et al. | |
| 2011/0209407 A1 | 9/2011 | Arya et al. | |
| 2011/0260092 A1 | 10/2011 | Nitzi et al. | |

FOREIGN PATENT DOCUMENTS

| | | |
|---|---|---|
| WO | 9845012 A1 | 10/1998 |
| WO | 9855195 A1 | 12/1998 |

OTHER PUBLICATIONS

Unofficial English translation of Chinese Office Action issued in connection with corresponding CN Application No. 201310026556.3 on May 27, 2015.

* cited by examiner

SYSTEM FOR DEAERATION IN A FLASH VESSEL

BACKGROUND OF THE INVENTION

The subject matter disclosed herein relates to syngas production systems and, more particularly, to systems for the deaeration of stream of slag sump water produced by a gasifier.

Gasifiers convert carbonaceous materials into a mixture of carbon monoxide and hydrogen, referred to as synthesis gas or syngas. For example, an integrated gasification combined cycle (IGCC) power plant includes one or more gasifiers that react, through a series of reactions, a feedstock at a high temperature with oxygen and/or steam to produce syngas. The series of reactions is collectively referred to as the gasification process. Upon gasification, the resulting syngas may include less desirable component, such as hot ash in the form of slag. Accordingly, the syngas may be directed through a quench unit to cool the syngas to a saturation temperature and remove at least some of the less desirable components. The less desirable components may form by-products, such as a slag stream produced from the ash.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a flash vessel having a first inlet configured to introduce a first fluid into the flash vessel, wherein the flash vessel is configured to flash the first fluid to produce a first flash gas, a second inlet configured to introduce a stream of slag sump water into the flash vessel, wherein the stream of slag sump water includes a mixture of water, oxygen ($O_2$), and at least one of a gasification slag and char, a gas-liquid contactor disposed within the flash vessel, wherein the gas-liquid contactor is configured to contact the stream of slag sump water with the first flash gas to enable the first flash gas to deaerate the stream of slag sump water; and a first outlet configured to output an overhead discharge having a second flash gas and oxygen from the stream of slag sump water.

In a second embodiment, a system includes a gasifier configured to gasify a carbonaceous feed to produce syngas, a quench portion configured to quench the produced syngas using at least water to generate a stream of quenched syngas, a slag stream having dissolved oxygen, and a blackwater stream. The system also includes a flash vessel disposed downstream from the quench portion, wherein the flash vessel is configured to receive a liquid feed at a first inlet and the blackwater stream at a second inlet, wherein the liquid feed comprises a stream of slag sump water generated by water contact with the slag stream, and wherein the flash vessel comprises a gas-liquid contactor configured to contact the liquid feed with a first flash gas to deaerate the slag sump water to produce a stream of substantially deaerated liquid feed.

In a third embodiment, a system includes a gasifier configured to gasify a carbonaceous feed to produce a syngas, a quench portion configured to quench the syngas using at least water to generate a stream of quenched syngas, a slag stream, and a first blackwater stream. The system also includes a first flash vessel disposed downstream from the quench portion, wherein the first flash vessel is configured to receive and flash the first blackwater stream at a first pressure to produce a first flash gas and a second blackwater stream, and the second blackwater stream has a lower pressure than the first blackwater stream. The system further includes a second flash vessel disposed downstream from the first flash vessel, wherein the second flash vessel is configured to receive the second blackwater stream at a first inlet, the second flash vessel is configured to receive a liquid feed having dissolved oxygen at a second inlet, and the second flash vessel is configured to flash the second blackwater stream at a second pressure to produce a second flash gas to deaerate the liquid feed to produce a stream of substantially deaerated liquid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
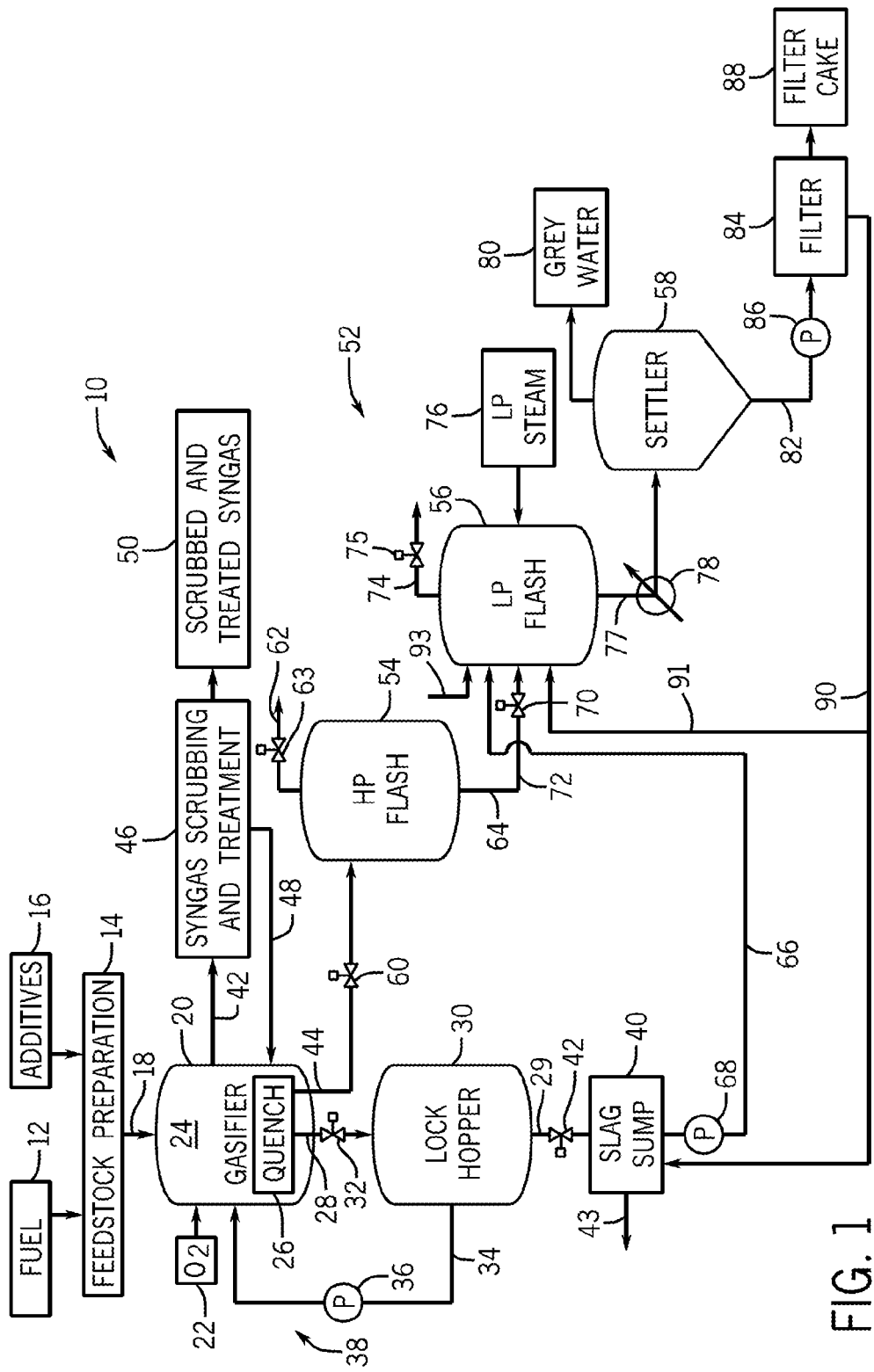
FIG. 1 is a diagrammatical illustration of an embodiment of a gasification system configured to produce syngas and to process black water and a stream of slag sump water produced by the system, the system including a high pressure flash tank configured to reduce a pressure of the black water and a low-pressure flash tank configured to further reduce a pressure of the black water and deaerate the stream of slag sump water using the black water.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements.

As noted above, gasifiers that produce syngas may also produce by-products, such as slag. The slag from the gasifier is mixed with water in a quench, and flows out of the quench as a slag stream. The slag stream is depressurized and collected in a slag sump. The slag stream is removed from the slag sump and dewatered, making the recovered water and water in the slag sump available for further use. Unfortunately, the water recovered from the slag stream and in the slag sump also includes dissolved oxygen absorbed from the air, such as the air in the immediate vicinity of slag sump 40, which can corrode various features disposed downstream from the gasifier. The downstream components may include piping, conduits, vessels, heat exchangers and/or pumps. In certain configurations, the oxygen may be removed using a vacuum flash vessel. The vacuum flash vessel uses vacuum pumps and associated equipment to enable the pressure within the vessel to be reduced below atmospheric pressure, or below the lowest operational pressure of a plant system having the gasifier. Accordingly, typical approaches toward the removal of dissolved oxygen in slag streams are often inefficient, costly, and/or subject to further improvement.

The present embodiments overcome these and other shortcomings by providing a low-pressure flash vessel having one or more gas-liquid contactors. The flash vessel is configured such that an aerated liquid feed, such as a stream of slag sump water having dissolved oxygen, flows over and through the gas-liquid contactor. Additionally, a flash gas, such as steam evolved from a gasifier blowdown stream as a result of a pressure reduction, flows through the gas-liquid contactor. The flash gas and the aerated liquid feed contact one another at the gas-liquid contactor, and the flash gas removes at least a portion of the dissolved oxygen in the liquid feed. In other words, the gasifier blowdown stream may be used to deaerate the stream of slag sump water using a single vessel.

The present embodiments may be used in conjunction with any gasification system that produces slag. For example, the present embodiments may be used in IGCC systems, syngas production systems, and methanation systems. FIG. 1 illustrates an embodiment of a gasification system 10. Within the gasification system 10, a carbonaceous fuel source 12 may be utilized as a source of energy to produce syngas. The fuel source 12 may include coal, petroleum coke, biomass, wood-based materials, agricultural wastes, tars, and asphalt, or other carbon containing materials.

The fuel source 12 may be introduced into the gasification system 10 via a feedstock preparation system 14. The feedstock preparation system 14 may resize or reshape, select, and/or dry the fuel source 12. According to certain embodiments, the feedstock preparation system 14 may include a grinding mill. Further, within the feedstock preparation system 14, additives 16, such as water, or other suitable liquids, may be added to the fuel source 12 to create a fuel slurry 18 as a gasifier feed. However, in other embodiments, such as where no liquid additives are employed, the gasifier feed 18 may be a dry or partially dried feedstock that may be conveyed into the gasifier for example using a carrier gas.

The fuel slurry 18 is directed to a gasifier 20 where the fuel slurry 18 is mixed with oxygen ($O_2$) 22 to produce syngas via a series of reactions, collectively referred to as a gasification process. In particular, during the gasification process the fuel slurry 18 may be reacted with a limited amount of oxygen at elevated pressures (e.g. from absolute pressures of approximately 20 bar to 85 bar) and temperatures (e.g., approximately 700° C. to 1600° C.) to partially oxidize the fuel slurry 18 and produce syngas. Due to chemical reactions between the oxygen 22, and the carbon and water within the fuel slurry 18, the syngas may include hydrogen, carbon monoxide, and carbon dioxide. Other less desirable components may also be formed, including products from ash produced during gasification, sulfur, nitrogen, and chloride.

The gasifier 20, shown in FIG. 1 as contained within a single pressure vessel 20 together with quench 26, also referred to as a quench gasifier, includes a reaction portion 24 where the gasification process is performed, and a quench portion 26 where the syngas produced by the gasification process is cooled. Within the reaction portion 24, the fuel slurry 18 may be heated to undergo a pyrolysis process. According to certain embodiments, temperatures inside the gasifier 20 may range from approximately 150° C. to 1600° C. during the pyrolysis process, depending on the type of fuel source 12 utilized to generate the fuel slurry 18. The heating of the feedstock during the pyrolysis process may generate a solid, e.g., char, and residue gases, e.g., carbon monoxide and hydrogen.

A combustion process may then occur in the gasifier 20. The combustion may include introducing oxygen to the char and residue gases. The char and residue gases may react with the oxygen to form carbon dioxide and carbon monoxide, which provides heat for the subsequent gasification reactions. According to certain embodiments, temperatures during the combustion process may range from approximately 700° C. to 1600° C. Next, steam may be introduced into the gasifier 20 during a gasification step. The char may react with the carbon dioxide and steam to produce carbon monoxide and hydrogen at temperatures ranging from approximately 800° C. to 1100° C. In essence, the gasifier 20 utilizes steam and oxygen to allow some of the feedstock to be "burned" to produce carbon dioxide and energy, which drives a second reaction that converts further feedstock to additional hydrogen and carbon monoxide. In this way, a resultant gas is manufactured by the gasifier 20. This resultant gas may principally include carbon monoxide and hydrogen, as well as methane, carbon dioxide, water, hydrogen chloride, hydrogen fluoride, ammonia, hydrogen cyanide, and hydrogen sulfide and carbonyl sulfide (depending on the sulfur content of the feedstock). Non-gasifiable ash material and unconverted and/or incompletely converted fuel from the feedstock slurry may be byproducts of the process that may exist as larger particles of molten slag and smaller particles, referred to as fines or fine slag.

From the reaction portion 24, the syngas may enter the quench portion 26 where the syngas may be cooled and saturated. The quench portion 26 may be an integral part of the gasifier 20 as shown, or the quench portion 26 may be a separate unit. The quench portion 26 may cool the syngas to at or near a saturation temperature through evaporation of a cooling fluid, such as water, causing less desirable components to solidify. In particular, the molten slag may be rapidly cooled and solidified into coarse slag particles 28 that may be collected in the bottom of the quench portion 26.

In certain embodiments, the syngas and particulate solids may undergo certain process steps after exiting gasifier 20 and before entering quench portion 26. By way of non-limiting example, these other processes may include, but are not limited to, partial cooling by indirect heat exchange with boiler feed water to produce steam. Additionally or alternatively, such processing may include at least a partial separation of the slag and other particulate solids from the syngas, and separately quenching the at least partially separated slag and other particulate solids from the syngas and remaining particulate solids, where the quenching of the syngas and remaining particulate solids may include quenching, cooling, or scrubbing, or any combination thereof, of the syngas and remaining particulate solids in a scrubber to produce a stream of saturated syngas and a stream of black water. Furthermore, the syngas and particulates produced within the gasifier 20 may be used as reactants to help convert additional feedstock in a second stage reactor, may be contacted with steam or $CO_2$ to modify the composition of the syngas and/or partially cool the syngas and particulate solids, and so on.

The coarse slag 28 may flow, for example, by gravity, from the quench portion 26 into a pressurized lock hopper 30 at regular intervals. For example, in some embodiments, a control valve 32 may control the amount of coarse slag 28 delivered to the lock hopper 30. In certain embodiments, liquid 34 (e.g., water) may be removed from the coarse slag 28 within the lock hopper 30 and returned to the quench portion 26 of gasifier 20. In the illustrated embodiment, the liquid 34 is motivated by a pump 36 disposed along a divergent flow path 38 between the lock hopper 30 and the gasifier 20. A resulting slag 29 may then be removed from the lock hopper 30 and directed to a slag sump unit 40. For example, the slag 29 is directed from the lock hopper 30, through a control valve 42 and to the slag sump unit 40. The slag 29 settles to the bottom of sump unit 40 and may be removed from the slag sump unit 40 using, for example, a slag drag conveyor (not shown), which produces partially dewatered slag stream 43. Removal of slag stream 43 facilitates recovery of the water remaining in slag sump 40, such as by use of sump pump 68, which produces a stream of slag sump water 66. Indeed, in accordance with present embodiments, the stream of slag sump water 66 is deaerated to eventually produce grey water or process water that may be used for various processes within the gasification system 10.

Returning to the operation of the gasifier 20, in addition to producing slag 28, the quench portion 26 may produce partially cooled syngas 42 and black water 44, which may also be referred to as gasifier blowdown. The black water 44 includes a mixture of fines and char, and water produced within the gasifier 20, and generally will be at elevated temperatures, up to the saturation temperature of the water at the pressure in quench 26. The partially cooled syngas 42 may be directed to a syngas scrubbing and treatment system 46 where additional fines, char and other entrained gases, such as hydrogen chloride, may be removed. In particular, within the syngas scrubbing and treatment system 46, the fines and char may be separated from the syngas to produce another stream of black water 48 that may exit a bottom portion of the syngas scrubbing and treatment system 46 while scrubbed syngas 50 may exit the syngas scrubbing and treatment system 46.

The black water 48 exiting the syngas scrubbing and treatment system 46 may be used in quench portion 26, or may be combined with the black water 44 from the quench portion 26 and be directed to a black water processing system 52. In other embodiments, the black water 44 and the black water 48 may be provided to the black water processing system 52 as separate streams. The black water processing system 52 may include one or more flash tanks that subject the black water 44 and 48 to a series of pressure reductions to remove dissolved gases and concentrate the fines. Heat from the flash tanks may be recovered and used to heat other streams within the gasification system 10.

The black water processing system 52 of FIG. 1 includes a high pressure flash tank 54, a low pressure flash tank 56, and a settler 58. Although the high and low pressure flash tanks 54, 56 are illustrated, in other embodiments, the gasification system 10 may include only the low pressure flash tank 56, as discussed below. The high and low pressure flash tanks 54, 56, in a general sense, may promote separation of fines through a reduction in pressure that causes the black water 44 to be partially evaporated and cooled. In the illustrated embodiment, the high and low pressure flash tanks 54, 56 subject the black water 44 to a progressively reduced pressure, thereby facilitating further removal of dissolved gases. According to certain embodiments, the dissolved gases may include syngas, absorbed from quench portion 26 and/or syngas scrubbing and treatment system 46.

During operation, the black water 44 is discharged from the quench portion 26 of the gasifier 20, and flows through a level control valve 60. The level control valve 60 may control the liquid level in high-pressure flash tank 54, and consequently the amount of black water 44 flowing to the high-pressure flash tank 54. Control valve 60 also may partially flash the black water 44 to produce steam in addition to any steam that may already be present in the black water 44. For example, the level control valve 60 may reduce the pressure of the black water 44 to between approximately 20.7 bar (300 pound per square inch (PSI)) and approximately 62.1 bar (900 PSI), such as between approximately 25 bar and 55 bar, 30 bar and 45 bar, or 35 bar and 40 bar.

The high-pressure flash tank 54 is configured to perform a first flash event on the black water 44 to produce a first overhead vapor 62. Indeed, the high pressure flash tank 54 may flash the black water 44 to a first reduced pressure, such as to between approximately 20.7 bar-gauge (barg) (approximately 300 PSI-gauge (PSIG)) and approximately 6.9 barg (approximately 100 PSIG). For example, the pressure of the black water 44 may be reduced to between approximately 20 barg and 7 barg, such as between approximately 18 barg and 9 barg, 16 barg and 11 barg, or 14 barg and 13 barg. The first overhead vapor 62 produced by the first flash event may include a mixture of syngas, hydrogen ($H_2$), CO, $CO_2$, and hydrogen sulfide ($H_2S$). The first overhead vapor 62 may be provided to the syngas scrubbing and treatment system 46 where various gas separation and capture processes are performed.

The pressure within the high pressure flash vessel 54 and, thus, the extent to which the black water 44 is flashed, is controlled using a pressure control valve 63. For example, the pressure control valve 63 may control the backpressure of the first overhead vapor 62 by controlling its flow rate to downstream processes. That is, as the flow of the first overhead vapor 62 is adjusted by the pressure control valve 63, the pressure within the high pressure flash vessel 54 also adjusts.

In addition, the high pressure flash tank 54 produces a first discharged black water 64 that exits proximate a lower portion (e.g., the bottom) of the high pressure flash tank 54. The first discharged black water 64 may be cooled compared to the blackwater 44 produced at the quench portion 26 of the gasifier 20. For example, as the first overhead vapor 62 begins to evaporate away from the bulk of the black water 44, the black water within the high-pressure flash tank 54 may cool. For example, the black water 44 may be between 215 and 270° C., such as between 230 and 250° C., while after cooling the first discharged stream black water 64 may have cooled to between 170 and 220° C., such as between 185 and 210° C.

Once the first discharged black water 64 is produced, it is provided to the low-pressure flash tank 56. In the illustrated embodiment, the first discharged black water 64 is provided to a lower portion of the low-pressure flash tank 56 (e.g., proximate the bottom of the low pressure flash tank 56). Indeed, in accordance with present embodiments, vapor produced by flashing the first discharged black water 64 within the low-pressure flash tank 56 may be used as a first flash gas within the low-pressure flash tank 56, as is described in detail below.

Substantially simultaneously, a stream of sump water 66 is provided to the low-pressure flash tank 56 at an upper portion (e.g., proximate the top of the low pressure flash tank 56). For example, as illustrated, the stream of sump water 66 is motivated toward the low-pressure flash tank 56 by a sump pump 68. In accordance with certain embodiments, the stream of sump water 66 may include dissolved oxygen from atmospheric air proximate the slag sump 40, and may have a lower temperature than the black water 44 and the first discharged black water 64. Unfortunately, the dissolved oxygen may preclude the use of this sump water in other plant processes, as the oxygen may oxidize and corrode various conduits, vessels, and other plant equipment. However, the present embodiments provide for the stream of sump water 66 to be contacted with vapor produced from the first discharged black water 64 within the low-pressure flash tank 56 in a manner that deaerates the stream of sump water 66 and cools the vapor.

Figure 3:
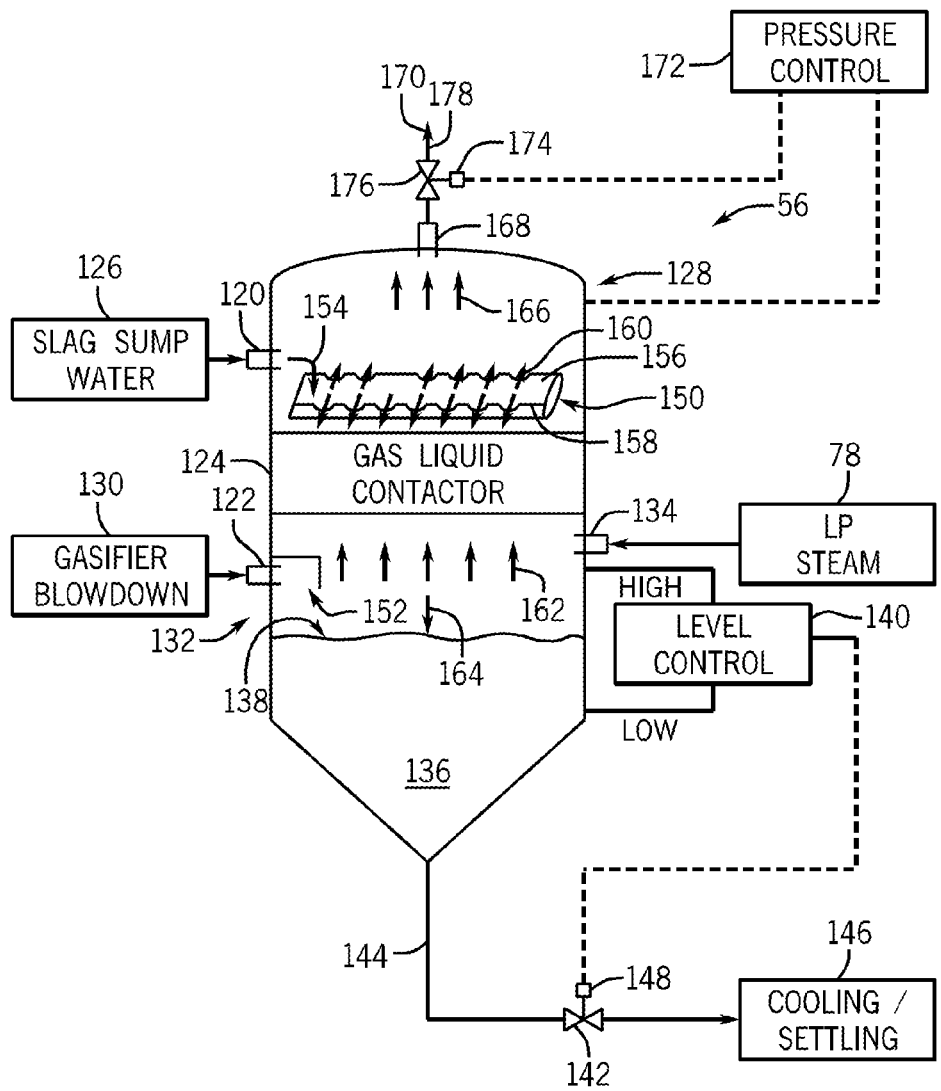
FIG. 3 is a diagrammatical illustration of a generalized embodiment of the low-pressure flash tank of FIG. 1 or 2.

For example, as is discussed in detail below with respect to FIGS. 3-5, the low-pressure flash tank 56 includes one or more gas-liquid contacting features for contacting a flash gas produced from the first discharged black water 64 with the stream of slag sump water 66. Indeed, the amount of first discharged black water 64 that may be provided to the low-pressure flash tank 56 may be at least partially controlled using a level control valve 70 disposed along a conduit 72 fluidly coupling the high-pressure flash tank 54 and the low-pressure flash tank 56. The level control valve 70, in addition to controlling the level in high-pressure flash tank 54 and therefore the flow of the first discharged black water 64 along the conduit 72, may also partially flash the first discharged black water 64 to produce at least a portion of the flash gas that will be used to deaerate the stream of sump water 66. Indeed, level control valve 70 may reduce the pressure of the first discharged black water 64 to between approximately 4.8 bar (70 PSI) and approximately 17.2 bar (250 PSI), such as between approximately 5.0 bar and 17.0 bar, 7.0 bar and 15.0 bar, or 9.0 bar and 11.0 bar. Accordingly, as the first discharged black water 64 enters the low-pressure flash tank 56, the first discharged black water 64 may be a multi-phase flow (e.g., a three-phase flow) including vapor such as steam, some $CO_2$, some syngas, and various particulates (e.g., fines and char).

The low-pressure flash tank 56 has a reduced internal pressure compared to the pressure in the high-pressure flash tank 54. As an example, the low-pressure flash tank 56 may reduce the pressure of the incoming first discharged black water 64 to between approximately 1.4 and 3.4 barg to produce a flash gas. For example, pressure of the first discharged black water 64 may be reduced to between approximately 2.2 and 3.1 barg, or 2.5 and 2.9 barg. Indeed, as this pressure reduction occurs, the first discharged black water 64 produces the flash gas or vapor, which flows toward the top of the low-pressure flash tank 56. Because the stream of slag sump water 66 enters the top of the low-pressure flash tank 56, and is substantially in the liquid phase, it begins to flow down toward the bottom of the low-pressure flash tank 56. The combination of the countercurrent flow of the stream of slag sump water 66 and the flash gas and the gas-liquid contacting features within the low-pressure flash tank 56 causes the flash gas to strip a substantial portion of the dissolved gases from within the stream of slag sump water 66. This causes the stream of slag sump water 66 to become deaerated, while cooling the flash gas to produce a second overhead vapor 74. As with the first overhead vapor 62, the flow rate of the second overhead vapor 74 is controlled using a pressure control valve 75. Thus, pressure control valve 75 also controls the pressure within the low pressure flash vessel 56 and the extent to which the first discharged black water 64 is flashed.

In addition to the first discharged black water 64 and the stream of slag sump water 66 that are provided to the low-pressure flash tank 56, in some embodiments, a stream of low-pressure steam 76 may also be provided to the tank 56. For example, the low-pressure steam 76 may help to regulate the pressure and/or temperature within the low-pressure flash tank 56. The low-pressure steam 76 may also help to flash the first discharged black water 64 as it enters the low-pressure flash tank 56. The low-pressure stream 76 must be at a pressure at least as high as the pressure in the low-pressure flash tank 56. Thus, in some embodiments, the pressure of the low-pressure steam 76 may be between approximately 2 and 8 bar, such as between approximately 3 and 6 bar, or 4 and 5 bar. It should be noted that while the illustrated embodiment depicts the low-pressure steam 76 as being provided to the low-pressure flash tank 56, in some embodiments the low-pressure steam 76 may not be provided.

As the first discharged black water 64 flashes within the low-pressure flash tank 56, the produced flash gas deaerates the stream of slag sump water 66 to produce the second overhead vapor 74 and a deaerated liquid discharge 77 having deaerated slag sump water and a liquid portion (i.e., non-flashed portion) of the first discharged black water 64. As noted above, the flashing process results in cooling of the residual fluids left in the tank. Moreover, because the stream of slag sump water 66 has a temperature ranging between approximately 50 and 100° C., such as between approximately 60 and 90° C. or 70 and 80° C., the second overhead vapor 74 has a reduced temperature compared to the first discharged black water 64. For example, the second overhead vapor 74 may have a temperature between approximately 100 and 150° C. For example, the temperature may be between approximately 90 and 140° C., 95 and 140° C., or 100 and 130° C. It should be noted that the reduced temperature of the second overhead vapor 74 may obviate the need for various additional cooling and treatment features, which may otherwise be used when the stream of slag sump water 66 is not contacted with flash gas produced from the first discharged black water 64. Furthermore, such contacting may obviate the need for additional deaeration features for the stream of slag sump water 66, such as vacuum flash tanks, deaerators, and so on. Thus, in addition to providing savings in equipment and operational costs, the present embodiments may allow the deaerated liquid discharge 77 to be directly processed by processing equipment, with its constituents (e.g., water, fine slag) being used for various purposes, such as make-up water, road base, and so on.

For example, in the illustrated embodiment, the deaerated liquid discharge 77 exits the low-pressure flash tank 56, and is directed to a heat exchanger 78 where it is cooled to below approximately 100° C. For example, the deaerated liquid discharge 77 may be cooled to between approximately 40 and 100° C., 50 and 90° C., 60 and 80° C., or to approximately 77° C. The cooled temperature of the deaerated liquid discharge 77 may aid in the separation of constituent grey water 80 and a concentrated fine slag and char stream 82 within the settler 58. Indeed, the deaerated liquid discharge 77 may be provided to the settler 58, and a substantial portion of the fine slag and char within the discharge 77 may settle. This produces the grey water 80 and the concentrated fine slag and char stream 82, with the grey water 80 being sent for further purification, for use as a source of make-up water, or for use in the gasification reaction (e.g., as a quench water source for quench portion 26). The concentrated fine slag and char stream 82 may be removed from a bottom portion of the settler 58 and provided to a filter 84, such as a rotary filter. For example, the concentrated fine slag and char stream 82 may be pumped to the filter 84 by a pump 86, and the concentrated fine slag and char stream 82 may be further separated into a filter cake 88 and a filtrate stream 90. The filter cake 88 may include solid fine slag and other particulates that are produced by the gasification reaction. The filtrate stream 90 may include the water of the concentrated fine slag and char stream 82, as well as fine particulates that are not removed by the filter 84.

It should be noted that filtrate stream 90 is recycled to the slag sump 40. This filtrate stream 90 may constitute at least a portion of the stream of slag sump water 66 that is provided to the low pressure flash vessel 56. Alternatively, filtrate stream 90 may be directly routed to low pressure flash vessel 56, which is illustrated as alternate stream 91. Thus, the alternate stream 91 may enter into the low pressure flash vessel 56 via an inlet that is the same as, or different than an inlet configured to receive slag sump water 66. Indeed, in certain embodiments, stream 90 may be routed separately from or instead of the slag sump water 66. Moreover, at least one other water stream 93 for use in gasification system 10 may be deaerated separately or in combination with either or both the slag sump water 66 and the fines filtrate stream 90 in low pressure flash vessel 56, including but not limited to process water makeup. In other words, the low pressure flash vessel 56 may also deaerate the filtrate stream 90 and the at least one other water stream 93 for use in the syngas production system. Accordingly, the low pressure flash vessel 56 may include a respective inlet for steam 93, or stream 93 may be introduced into the low pressure flash vessel 56 via the same inlets used for either or both of the slag sump water 66 and/or the alternate stream 91.

Figure 2:
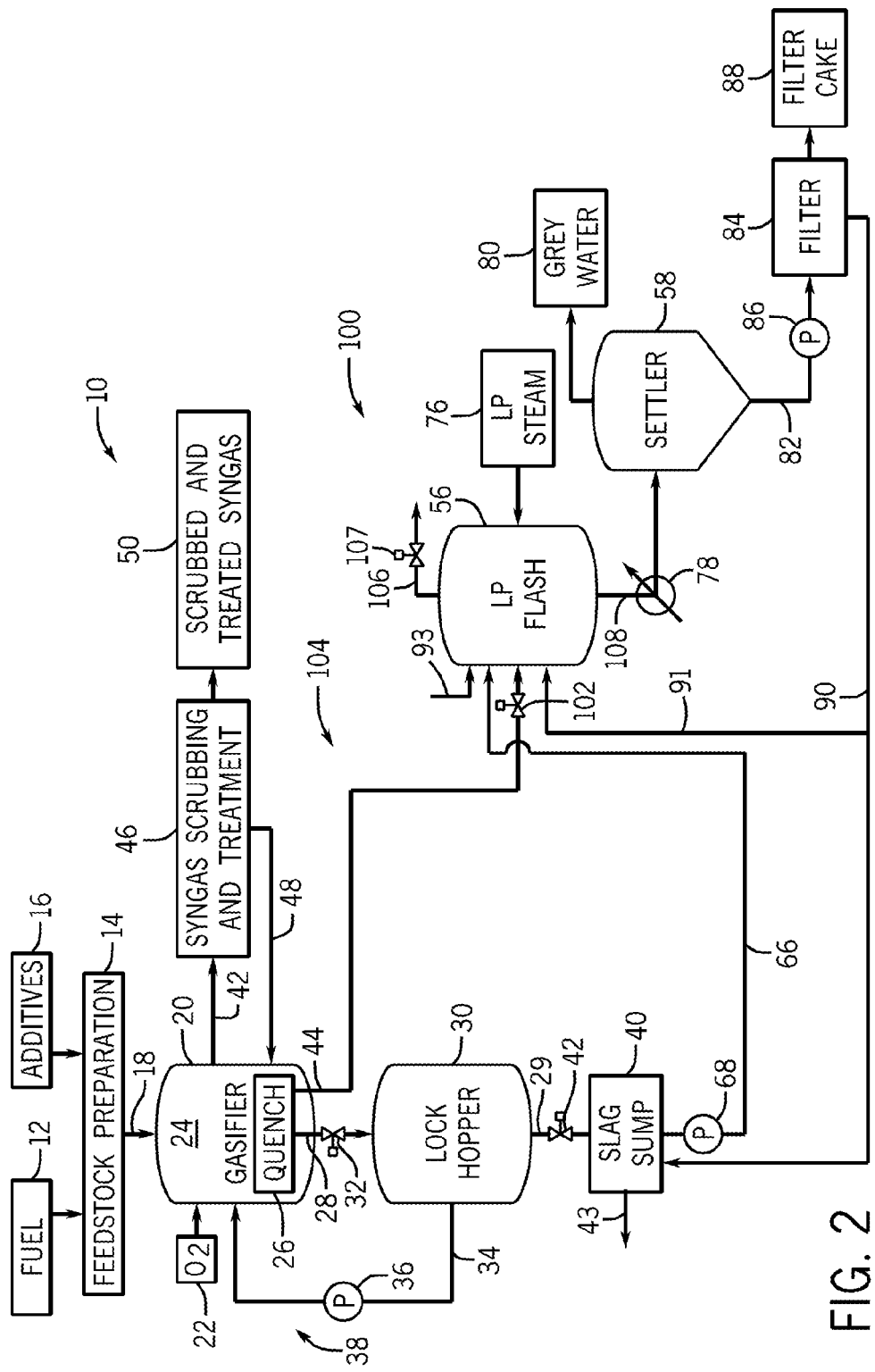
FIG. 2 is a diagrammatical illustration of an embodiment of a gasification system configured to produce syngas and to process black water and a stream of slag sump water produced by the system, the system including a low-pressure flash tank configured to receive the black water directly from a gasifier of the system and deaerate the slag sump using the black water flash gas.

While it may be desirable to let the pressure of the black water 44 (i.e., the gasifier blowdown) down over more than one stage, the present embodiments also provide for the pressure and temperature to be reduced in a single stage at the low-pressure flash tank 56. Indeed, such embodiments may further reduce the equipment and operational costs associated with the treatment of blowdown water from the quench portion 26. FIG. 2 illustrates an embodiment of such a black water treatment system 100 having only one flash tank, such as a low-pressure flash tank, for treating blowdown water (e.g., black water 44 and 48), which includes byproducts from gasifier 20. Indeed, the black water treatment system 100 is illustrated as a part of the gasification system 10. Accordingly, the components of the black water treatment system 100 will be discussed in a similar context to the gasification process described above with respect to FIG. 1 using the same reference numerals for the same elements.

As described above, the gasifier 20 produces untreated syngas 42, slag 28, and blackwater 44. The untreated syngas 42 is provided to the syngas scrubbing and treatment system 46, which produces scrubbed and treated syngas 50 and additional black water 48. The coarse slag 28 is provided to the lock hopper 30, which sends the slag 29 to the slag sump 40, where the slag 29 remains until the stream of slag sump water 66 is utilized in the black water treatment system 100.

In the illustrated embodiment, the black water 44, which may include the additional black water 48 produced at the syngas scrubbing and treatment system 46, is provided directly to the low-pressure flash tank 56 without the high-pressure flash tank 54. Specifically, the black water 44 flows through a level control valve 102 disposed along a conduit 104 fluidly coupling the low-pressure flash tank 56 with the quench portion 26. The level control valve 102 may flash the black water 44 to produce, in some embodiments, a multi-phase flow including steam, some $CO_2$, some syngas, water, and slag particulates. For example, the level control valve 102 may reduce the pressure of the black water 44 to between approximately 24.1 bar (350 PSI) and approximately 80.7 bar (1170 PSI), such as between approximately 30 bar and 75 bar, or 40 bar and 50 bar.

Because the black water 44 has not been flashed in a flash tank prior to introduction into the low-pressure flash tank 56, the black water entering the low-pressure flash tank 56 may have a higher temperature than described above with respect to FIG. 1. For example, the black water 44, upon or immediately prior to introduction to the low-pressure flash tank 56, may have a temperature of between approximately 215 and 270° C., such as between approximately 230 and 250° C. As noted above, the pressure of the low-pressure flash tank 56 may be between approximately 1.4 and 3.4 barg, such as between approximately 2.2 and 3.1 barg, 2.5 or 2.9 barg. Indeed, because the black water 44 may have a much higher pressure before introduction into the low-pressure flash tank 56, such as between approximately 20 and 80 barg, 30 and 70 barg, or 40 and 70 barg (e.g., 69 barg), the black water 44 may flash upon entry into the low-pressure flash tank 56. Indeed, in accordance with one embodiment, the black water 44 flashes to produce a first flash gas within the low-pressure flash tank 56.

Substantially simultaneously, the stream of slag sump water 66 may be provided to the low-pressure flash tank 56, as noted above. The pressure within the low-pressure flash tank 56 is such that the first flash gas, which is a flashed portion of the black water 44, deaerates the stream of slag sump water 66 as the two flows mix via a countercurrent and via a gas-liquid contacting feature. The gas-liquid contacting feature may include a plurality of Raschig rings (e.g., hollow cylindrical structures), one or more valve trays (e.g., fixed valve trays), or the like. The stream of slag sump water 66, as noted above, also cools the first flash gas and the remaining black water 44 within the low-pressure flash tank 56. Thus, as a result of this mixing, deaeration, and cooling, an overhead vapor 106 and a deaerated liquid discharge 108 are produced by the tank 56. The overhead vapor 106, which exits proximate the top of the low-pressure flash tank 56, may therefore include at least a substantial portion of the oxygen previously dissolved in the stream of slag sump water 66, steam, some syngas, some $CO_2$, some acid gas, and similar gases. Moreover, the overhead vapor 106 may have a pressure that is substantially equal to the pressure within the low-pressure flash tank 56. Further, as discussed above with respect to FIG. 1, the pressure within the low pressure flash vessel 56 is controlled by a pressure control valve 107. The pressure control valve 107 controls the flow rate of the overhead vapor 106 and, therefore, its back-pressure, which adjusts the extent to which the black water 44 is flashed within the low pressure flash vessel 56.

As noted above, the black water 44, which in the illustrated embodiment is provided directly to the low-pressure flash tank 56, is utilized to deaerate the stream of slag sump water 66. Indeed, in accordance with present embodiments, the first flash gas (i.e., the flashed portion of the black water 44 within the low-pressure flash tank 56) may remove between 60 and 100% of the oxygen dissolved within the stream of slag sump water 66. For example, the first flash gas may remove between approximately 70 and 100%, 80 and 100%, or 90 and 100% of the dissolved oxygen. Indeed, in some embodiments, the first flash gas may deaerate the stream of slag sump water 66 to an extent such that any dissolved oxygen present in the stream of slag sump water 66 may have little to no effect on piping, conduits, pumps, or other vessels that the deaerated liquid discharge 108 may contact during operation of the system 10.

The deaerated liquid discharge 108, in a similar manner to the deaerated liquid discharge 77 of FIG. 1, is cooled in the heat exchanger 78 and provided to the settler 58. The settler 58 produces grey water 80 and the concentrated fine slag and char stream 82. The concentrated fine slag and char stream 82 is provided to the filter 84, which separates the concentrated fine slag and char stream 82 into the filter cake 88 for inclusion in various solid materials (e.g., road base) and the fines filtrate 90, which is used as a source of make-up water for the slag sump 40. In some embodiments, the filter cake 88 may additionally or alternatively be used in the gasifier 20 as a source of fuel. In other embodiments the fines filtrate 90 may be used for feedstock slurry preparation and/or as grey water makeup by feeding the fines filtrate 90 to the low-pressure flash tank 56 for deaeration.

Moving now to FIG. 3, an embodiment of the low-pressure flash tank 56 is illustrated as including a first inlet 120, a second inlet 122 disposed below the first inlet 120, and a gas-liquid contactor 124 disposed between the first inlet 120 and the second inlet 122. The first inlet 120 is configured to receive a stream of slag sump water 126 (e.g., from the slag sump 40 of FIGS. 1 and 2) at an upper portion 128 of the low-pressure flash tank 56. Conversely, the second inlet 122 is configured to receive a gasifier blowdown 130 at a lower portion 132 of the low-pressure flash tank 56. As an example, the gasifier blowdown 130 may include the stream of black water 44 of FIG. 2 or the first discharged black water 64 of FIG. 1. Accordingly, the gas-liquid contactor 124 is positioned to facilitate the mixing of the slag sump water 126 as it falls downward within the low-pressure flash tank 56 with the upward-rising flash gas produced from the gasifier blowdown 130 as it flashes within the low-pressure flash tank 56.

The low-pressure flash tank 56 also includes a third inlet 134 configured to receive the low-pressure steam 76, which may facilitate pressure and/or temperature maintenance within the low-pressure flash vessel 56 and/or facilitate the flashing of the gasifier blowdown 130. A liquid 136, such as water or a mixture of water and other gasification products, is also present within the low-pressure flash tank 56 during operation. In accordance with present embodiments, the liquid 136 includes various black water components and slag sump water components, including slag and char, which may be residual from the gasifier blowdown 130 and the slag sump water 126. The liquid 136 may also include other dissolved gases at reduced concentrations compared to liquid water feeds 126 and 130, such as a small amount of syngas, inert gases, acid gases, among others, but may generally be considered to be deaerated, as is discussed below.

A level 138 of the liquid 136 may be controlled using a level control 140, which is operatively connected to the low-pressure flash tank 56 and to a flow control valve 142 disposed along a conduit 144 leading from the low-pressure flash tank 56 to a cooling/settling area 146. The cooling/settling area 146, in some embodiments, corresponds to the heat exchanger 78 and the settler 58, which lead to various filtration and water-recycling features of the gasification system 10 of FIG. 1 or 2. Thus, the level control 140, during operation, may monitor the level 138 of the liquid 136 to determine appropriate rates at which to deliver a deaerated liquid discharge (e.g., a portion of the liquid 136) from the low-pressure flash vessel 56 to the cooling/settling area 146. For example, the level control 140 may send control signals to an actuator 148 of the flow control valve 142 to adjust the position of the valve 142. As discussed in detail below, the pressure within the low pressure flash vessel 56 is controlled by controlling the flow of an overhead discharge from the vessel 56.

In addition to the features described above, the low-pressure flash tank 56 also includes a trough 150 and a baffle 152 disposed proximate the first and second inlets 120, 122, respectively. The trough 150 and the baffle 152, in a general sense, are configured to enhance the contacting of the liquid (e.g., the slag sump water 126) and the gas (e.g., the flashed portion of the gasifier blowdown 130) by providing a substantially even distribution of each across the low-pressure flash tank 56. The trough 150 is configured to receive a downward flow 154 (illustrated as an arrow) of the slag sump water 126 within the low-pressure flash tank 56. The trough 150 includes a base 156 with a plurality of recesses 158 disposed in the base 156. The base 156 is configured to receive the flow 154 and distribute the flow 154 across the recesses 158 to form a plurality of streams 160, illustrated as arrows. During operation, the streams 160 fall downward toward the gas-liquid contactor 124. It should be noted that while the low-pressure flash tank 56 is illustrated generally as including the trough 150, in certain embodiments the flash tank 56 may not include a trough, such as when the gas-liquid contactor 124 includes fixed valve trays.

The baffle 152 includes a fixed or movable projection disposed proximate the second inlet 122. The baffle 152 is configured to impede the flow of the gasifier blowdown 130 into the low-pressure flash tank 56. For example, impeding the flow of the gasifier blowdown 130 within the low-pressure flash tank 56 may prevent the influx of the blowdown 130 from impinging on an upward-rising, first flash gas 162. Indeed, in certain embodiments, reducing the impingement of the flow of the first flash gas 162 may help maintain the rate at which the slag sump water 126 is deaerated.

The first flash gas 162 may include a portion of the gasifier blowdown 130 that has been flashed and, in some embodiments, at least a portion of the low-pressure steam 76. In some embodiments, the first flash gas 162 mainly includes low-pressure steam produced from the blowdown 130 with trace gases produced in the gasification process. As illustrated, during operation, the first flash gas 162 and the streams 160 of the slag sump 126 are directed to the gas liquid contactor 124, where the slag sump 126 is deaerated while cooling the first flash gas 162.

The gas-liquid contactor 124, as noted above, is configured to facilitate the contacting of the flash gas 162 and the streams 160. Generally, the gas-liquid contactor 124 includes features, such as a plurality of flow impeding structures, to enable the flash gas 162 and the streams 160 to pass through a confined area to increase a probability of contacting via a counterflow. For example, the gas-liquid contactor 124 may provide an increased surface area for the streams 160 and the first flash gas 162 to interact. Because the first flash gas 162 is at a higher temperature than the streams 160, a certain amount of heat transfer from the first flash gas 162 to the streams 160 occurs. Accordingly, the first flash gas 162 is cooled while the streams 160 are heated. The increase in temperature of the streams 160 may serve to drive the dissolved oxygen in the streams 160 out of solution. Moreover, the first flash gas 162, being substantially vapor, may entrain a substantial portion of the oxygen. For example, the first flash gas 162 may entrain between 10 and 100% of the oxygen within the streams 160, such as between approximately 20 and 100%, 30 and 100%, 40 and 100%, 50 and 99%, 60 and 95%, or 70 and 90% of the oxygen within the streams 160. Indeed, in accordance with certain embodiments, the streams 160 may be deaerated by the flash gas 162 such that greater than approximately 50%, 60%, 70%, 80%, 90%, or 95% of the oxygen is removed to produce a deaerated slag sump water 164.

During operation, once the first flash gas 162 and the streams 160 have interacted at the gas-liquid contactor 124, the resulting deaerated slag sump water 164 may fall toward the bottom portion 132 of the low-pressure flash tank 56 to become a part of the liquid 136. The first flash gas 162, on the other hand, after interacting with the streams 160, becomes a second flash gas 166 (illustrated as arrows) having an increased concentration of oxygen and a reduced temperature compared to the first flash gas 162. The second flash gas 166 exits a gas outlet 168 disposed at the upper portion 128 of the low-pressure flash tank 56 as overhead vapor 170. The overhead vapor 170, which may correspond to the overhead vapor 106 of FIG. 2 or the second overhead vapor 74 of FIG. 1, may be provided to various features of the gasification system or other plant features for heating, cooling, or for use as a combustion fuel.

The pressure within the low-pressure flash tank 56 may be adjusted by controlling a backpressure of the overhead vapor 170, such as by using a backpressure control 172. The backpressure control 172 is operatively connected to the low-pressure flash tank 56 and an actuator 174 of a pressure control valve 176, which is disposed along a conduit 178 leading from the low-pressure flash tank 56 to various features of the gasification system or other plant features for heating, cooling, or for use as a combustion fuel. The backpressure control 172, during operation, may monitor the backpressure of the overhead vapor 170 and/or the pressure within the low pressure flash vessel 56 to determine appropriate rates at which to discharge the overhead vapor 170. For example, the backpressure control 172 may send control signals to the actuator 174 of the pressure control valve 176 to adjust the position of the valve 176 and, therefore, the flow rate of the overhead vapor 170 through the conduit 178.

It should be noted that the composition of the liquid 136 and the overhead vapor 170 may depend, at least partially, on the type of gas-liquid contactor 124 that is used in the tank 56. For example, the amount of deaeration that the first flash gas 162 performs on the slag sump 126 may depend on the manner in which the two are contacted. Indeed, the gas-liquid contactor 124 may include one or more valve trays, a sieve tray, a packed bed, a cap tray, or any feature capable of impeding flow and/or increasing the surface area between the first flash gas 162 and the slag sump 126. In embodiments in which the gas-liquid contactor 124 includes one or more valve trays, the valve trays may be fixed valve trays as opposed to movable valve trays. For example, fixed valve trays may enable a substantially constant flow of the slag sump water 126 through the gas-liquid contactor 124, unlike movable valve trays, which may become clogged by slag or other particulates. Similarly, in embodiments where the gas-liquid contactor 124 includes a sieve tray or a packed bed, the packed bed or the sieve tray may be configured such that filtration of the slag or other particulates is avoided, as the particulates may eventually cake and impede the flow of the slag sump water 126 through the gas-liquid contactor 124. For example, in embodiments where the gas-liquid contactor 124 includes a packed bed of Raschig rings, the Raschig rings may have openings that are larger than the slag particulates of the slag sump water 126 to avoid filtration of the slag sump water 126 and clogging of the packed bed.

Figure 4:
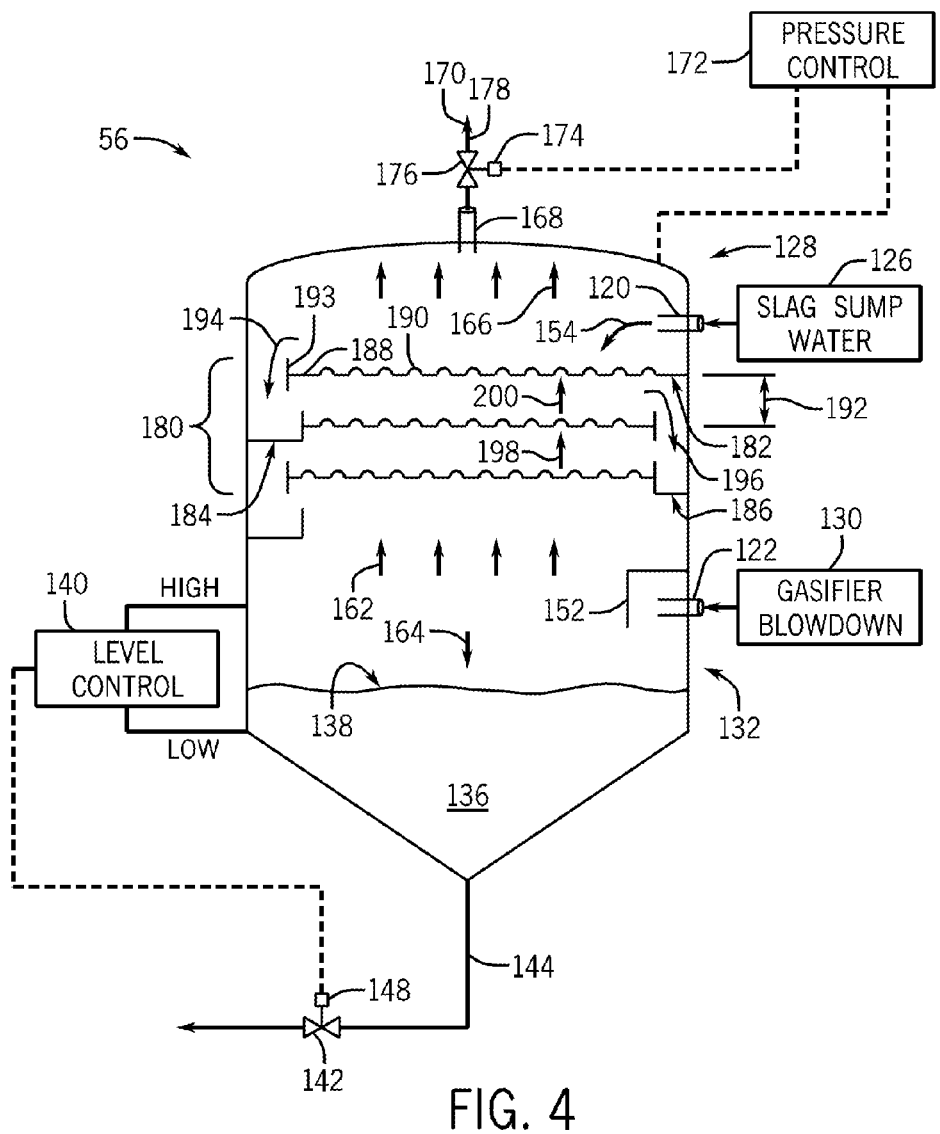
FIG. 4 is a diagrammatical illustration of an embodiment of the low-pressure flash tank of FIG. 3 using a plurality of fixed valve trays as the gas-liquid contactor.
Figure 5:
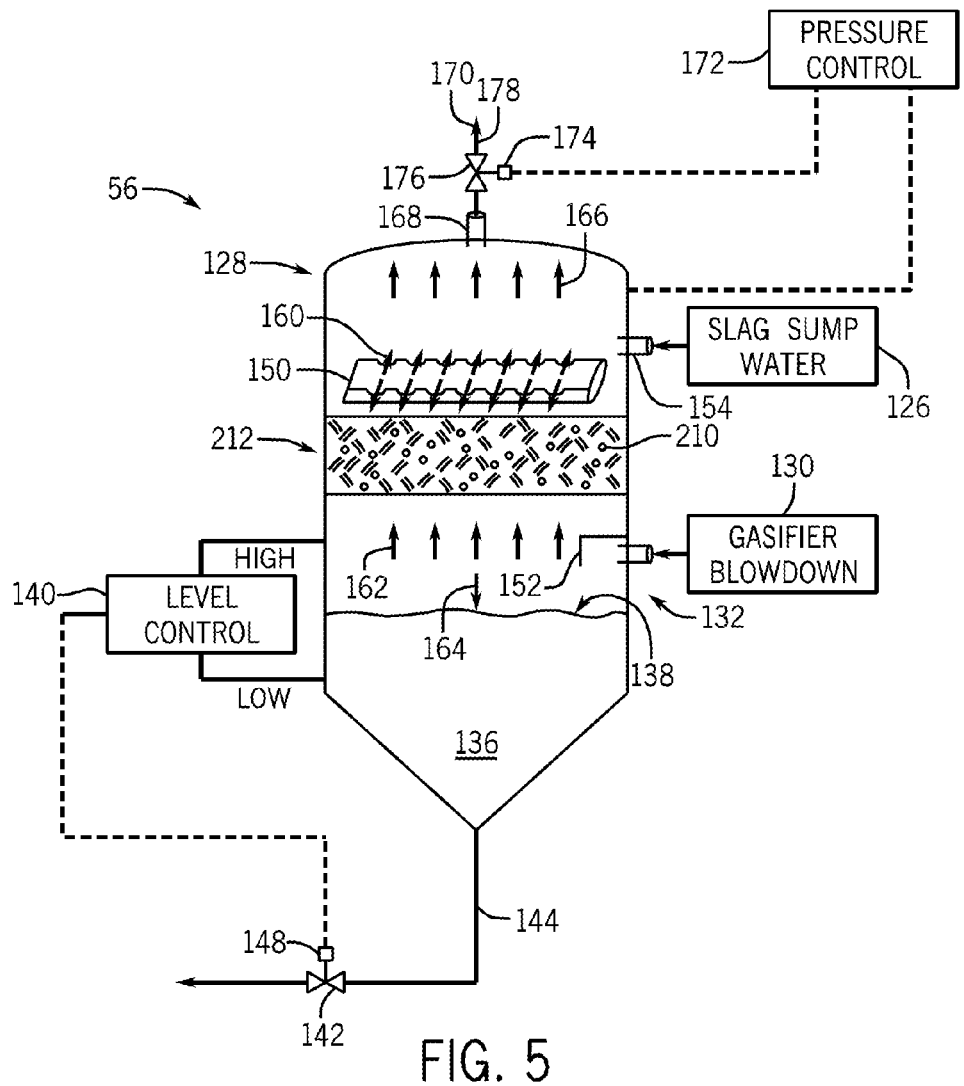
FIG. 5 is a diagrammatical illustration of an embodiment of the low-pressure flash tank of FIG. 3 using a fixed bed formed from a plurality of Raschig rings as the gas-liquid contactor.

One embodiment of the low-pressure flash tank 56 where the gas-liquid contactor 124 includes a plurality of fixed valve trays 180 is illustrated schematically in FIG. 4. While the embodiment illustrated in FIG. 4 includes three fixed valve trays, it should be noted that the low-pressure flash tank 56 may include any number of fixed valve trays to facilitate the removal of oxygen from the slag sump water 126. However, it should be noted that as the number of fixed valve trays increases, the cooling of the flash gas may also increase, which may increase the probability of condensing certain portions of the flash gas, such as the steam components. Accordingly, in some embodiments, the low-pressure flash vessel 56 may include from 1 to 5 fixed valve trays, from 1 to 4, or from 1 to 3 fixed valve trays.

As illustrated, the low-pressure flash tank 56 includes a first fixed valve tray 182, a second fixed valve tray 184, and a third fixed valve tray 186. Each of the fixed valve trays 182, 184, 186 includes a main tray portion 188 and a plurality of fixed valves 190, which are each projections covering holes in the main tray portion 188. During operation, the upward-rising flash gases 162 pass through the valves 190 toward the upper portion 128 of the low-pressure flash tank 56 while the downward flow 154 of the slag sump water 126 flows over the trays 182, 184, 186 and generally downward toward the bottom portion 132. Specifically, the slag sump water 126 flows across the trays 182, 184, 186 as the flash gases 162 pass through the fixed valves 190. This allows the flash gases to interact with the slag sump water 126 at least at the valves 190. The slag sump water 126 flows to downcomers 193 at the end of each tray 182, 184, 186, which enables the slag sump water 126 to flow down across the next tray, or to the liquid 136.

The fixed valve trays 182, 184, 186 may be spaced apart by a distance 192 that facilitates flow as well as contacting between the downward flow 154 of the slag sump water 126 and the flash gases (e.g., the first flash gas 162). The spacing between the trays may be approximately 24 inches (610 mm) A larger spacing, such as 30 inches (760 mm), may also be used to provide more access space between the trays. It may be appreciated that as the slag sump water 126 flows down through or across the fixed valve trays 182, 184, 186, it may become increasingly deaerated. Similarly, as the first flash gas 162 passes upward through the fixed valve trays 182, 184, 186, it may entrain increasing amounts of oxygen and may be progressively cooled.

For example, with respect to the progressive deaeration of the slag sump water 126, the flow 154 of the slag sump water 126, upon entry into the tank 56, encounters the first fixed valve tray 182. As the flow 154 flows across the first fixed valve tray 182, a first portion of the oxygen within the flow 154 of the slag sump water 126 is removed by flash gas to produce a second flow 194 (illustrated as an arrow) of the slag sump water 126. Similarly, as the second flow 194 encounters the second fixed valve tray 184, a second portion of oxygen may be removed from the second flow 194 by flash gas to produce a third flow 196 (illustrated as an arrow) of the slag sump water 126. As the third flow 196 encounters the third fixed valve tray 186, it is deaerated by the first flash gas 162 to produce the deaerated slag sump water 164. As an example, the first flash gas 162 may deaerate the third downward flow 196 of the slag sump 126 such that between approximately 70 and 100%, 80 and 100%, or 90 and 100% of the total dissolved oxygen of the slag sump water 126 has been removed within the low-pressure flash tank 56.

Regarding the progressive aeration and cooling of the first flash gas 162, the process may be considered in an opposite context to that described above for the downward flow 154 of the slag sump water 126. Thus, the first flash gas 162 is cooled to a first temperature to produce a first cooled flash gas 198 (illustrated as an arrow). The first cooled flash gas 198, having a lower temperature and a higher oxygen content compared to the first flash gas 162 is further cooled by contact with the liquid flow on the second tray 184, and entrains a second portion of oxygen to produce a second cooled flash gas 200.

The second cooled flash gas 200 is further cooled by the flow 154 of the slag sump water 126 and entrains a third portion of oxygen from the slag sump water 126 to produce the second flash gas 166, which exits the low-pressure flash tank 56 at the gas outlet 168 as the overhead vapor 170. As an example, the second flash gas 166 may exit the low-pressure flash tank 56 at a temperature of between approximately 90° C. and 150° C., such as between approximately 90 and 140° C., 95 and 130° C., or 100 and 120° C.

While the embodiment of the low-pressure flash tank 56 described above facilitates the deaeration of the slag sump water 126 using fixed valve trays, as noted above, the gas-liquid contactor 124 of FIG. 3 may include other features for contacting the slag sump water 126 and the first flash gas 162. FIG. 5 illustrates an embodiment of the low-pressure flash tank 56 in which the gas-liquid contactor 124 includes a plurality of Raschig rings 210 formed into a packed bed 212. In a general sense, the operation of the low-pressure flash tank 56 is the same as that described above with respect to FIG. 3.

In the illustrated embodiment, the Raschig rings 210 include hollow cylinders or similar hollow structures packed into the bed 212 in a random fashion. The Raschig rings 210 have a substantially random orientation within the packed bed 212. Therefore, during operation of the low-pressure flash tank 56, the first flash gas 162 and the streams 160 contact each other within the hollow portion of the Raschig rings 210 and/or in the small spaces between the Raschig rings 210. In certain embodiments, increasing the contact area between the slag sump 126 and the first flash gas 162 may enhance the deaeration of the slag sump 126 and the cooling of the first flash gas 162 compared to unconfined mixing via countercurrent flow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a flash vessel comprising:
  a first inlet fluidly coupled to a gasifier such that the flash vessel is configured to receive a first fluid from the gasifier, wherein the flash vessel is configured to flash the first fluid to produce a first flash gas;
  a second inlet fluidly coupled to the gasifier such that the flash vessel is configured to receive a stream of slag sump water from the gasifier, wherein the stream of slag sump water comprises a mixture of water, oxygen ($O_2$), and at least one of a gasification slag or char;
  a gas-liquid contactor disposed within the flash vessel, wherein the gas-liquid contactor is configured to contact the stream of slag sump water with the first flash gas to enable the first flash gas to deaerate the stream of slag sump water; and
  a first outlet configured to output an overhead discharge comprising a second flash gas and oxygen from the stream of slag sump water.

2. The system of claim 1, wherein the gas-liquid contactor is positioned within the flash vessel between the first inlet and the second inlet, and wherein the second inlet is disposed above the first inlet.

3. The system of claim 2, wherein the first outlet is disposed above the second inlet, the flash vessel comprises a second outlet disposed below the first inlet, and the second outlet is configured to output a stream of substantially deaerated liquid.

4. The system of claim 2, wherein the flash vessel comprises a third inlet fluidly coupled to a steam source and disposed below the second inlet such that the third inlet is configured to receive steam, and the steam is used in addition to the first flash gas to deaerate the stream of slag sump water.

5. The system of claim 1, wherein the gas-liquid contactor comprises a fixed valve tray, a packed bed having a plurality of Raschig rings, a sieve tray, or a combination thereof.

6. The system of claim 1, wherein the gasifier comprises:
  a gasification vessel configured to receive and gasify a carbonaceous fuel to produce a first syngas mixture; and
  a quench portion fluidly coupled to the gasification vessel such that the quench portion is configured to contact the first syngas mixture with water to produce a quenched syngas stream, a slag stream, and a blackwater stream, and wherein the first fluid comprises the blackwater stream.

7. The system of claim 6, wherein the blackwater stream has a pressure of between approximately 10 and 85 bar.

8. The system of claim 6, wherein the flash vessel has an average pressure of between approximately 2 and 10 bar.

9. The system of claim 1, wherein the flash vessel comprises a third inlet fluidly coupled to the gasifier such that the flash vessel is configured to receive a liquid feed from the gasifier, and the gas-liquid contactor is configured to contact the liquid feed with the first flash gas to enable the first flash gas to deaerate the liquid feed, and wherein the liquid feed comprises process water produced within a gasification system, or a stream of fines filtrate produced within the gasification system, or a combination thereof.

10. A system, comprising
a gasifier configured to gasify a carbonaceous feed to produce syngas;
a quench portion fluidly coupled to the gasifier such that the quench portion is configured to quench the produced syngas using at least water to generate a stream of quenched syngas, a slag stream having dissolved oxygen, and a blackwater stream;
a flash vessel disposed downstream from the quench portion, wherein the flash vessel is fluidly coupled to the quench portion and the gasifier such that the flash vessel is configured to receive a liquid feed at a first inlet and the blackwater stream at a second inlet, wherein the liquid feed comprises a stream of slag sump water generated by water contact with the slag stream, and wherein the flash vessel comprises a gas-liquid contactor configured to contact the liquid feed with a first flash gas to deaerate the slag sump water to produce a stream of substantially deaerated liquid.

11. The system of claim 10, wherein the first flash gas comprises steam produced from the blackwater stream.

12. The system of claim 11, wherein the flash vessel is at a first pressure and the blackwater stream is at a second pressure, the first pressure is lower than the second pressure, and the flash vessel is configured to flash at least the steam contained within the blackwater stream.

13. The system of claim 12, wherein the second pressure is between approximately 10 and 85 bar, and the first pressure is between approximately 2 and 10 bar.

14. The system of claim 10, wherein the first inlet is disposed above the second inlet, and the gas-liquid contactor is positioned within the flash vessel between the first inlet and the second inlet.

15. The system of claim 14, wherein the gas-liquid contactor comprises a plurality of flow impeding structures configured to increase contact of the liquid feed with the first flash gas in a counterflow of the liquid feed against the first flash gas.

16. The system of claim 15, wherein the plurality of flow impeding structures comprises a fixed valve tray, a packed bed having a plurality of Raschig rings, a sieve tray, or a combination thereof.

17. The system of claim 10, comprising a slag sump fluidly coupled to the quench portion such that the slag sump is configured to receive at least a portion of the slag stream from the quench portion, and the slag sump is configured to generate the stream of slag sump water.

18. The system of claim 17, comprising:
a settler fluidly coupled to the flash vessel such that the settler is configured to separate the stream of substantially deaerated liquid into a stream of grey water and a stream of fines; and
a filter fluidly coupled to the settler such that the filter is configured to separate the stream of fines into a filter cake and a filtrate stream comprising water and dissolved gases, the filter is coupled to the slag sump, the flash vessel, or both, and the slag sump, the flash vessel, or both, are configured to receive the filtrate stream such that the liquid feed comprises at least a portion of the filtrate stream.

19. A system, comprising:
a gasifier configured to gasify a carbonaceous feed to produce a syngas;
a quench portion fluidly coupled to the gasifier such that the quench portion is configured to quench the syngas using at least water to generate a stream of quenched syngas, a slag stream, and a first blackwater stream;
a first flash vessel fluidly coupled to the quench portion such that the first flash vessel is configured to receive and flash the first blackwater stream at a first pressure to produce a first flash gas and a second blackwater stream, and the second blackwater stream has a lower pressure than the first blackwater stream; and
a second flash vessel fluidly coupled to the first flash vessel such that the second flash vessel is configured to receive the second blackwater stream at a first inlet, the second flash vessel is configured to receive a liquid feed having dissolved oxygen and at least a portion of the slag stream at a second inlet, and the second flash vessel is configured to flash the second blackwater stream at a second pressure to produce a second flash gas to deaerate the liquid feed to produce a stream of substantially deaerated liquid.

20. The system of claim 19, wherein the second flash vessel comprises a gas-liquid contactor, and the gas-liquid contactor comprises a plurality of flow impeding structures configured to increase contact of the liquid feed with the second flash gas in a counterflow of the liquid feed against the second flash gas.

21. The system of claim 19, comprising a slag sump fluidly coupled to the quench portion such that the slag sump is configured to receive at least the portion of the slag stream from the quench portion, the slag sump is configured to remove a portion of water within at least the portion of the slag stream to generate a stream of slag sump water and a water recycle stream, the water recycle stream is recycled to the gasifier, and the liquid feed comprises the stream of slag sump water.

22. The system of claim 21, comprising:
a settler fluidly coupled to the second flash vessel such that the settler is configured to separate the stream of substantially deaerated liquid into a stream of grey water and a stream of fines; and
a filter fluidly coupled to the settler such that the filter is configured to separate the stream of fines into a filter cake and a filtrate stream comprising water and dissolved gases, the filter is coupled to the slag sump, the second flash vessel, or both, and the slag sump, the second flash vessel, or both, are configured to receive the filtrate stream such that the liquid feed comprises at least a portion of the filtrate stream.

23. The system of claim 1, wherein a trough is disposed within the flash vessel, and wherein the trough is configured to evenly distribute the stream of slag sump water across the flash vessel by receiving a flow of the stream of slag sump water and distributing the flow of the stream of slag sump water across the trough forming a plurality of streams of slag sump water.

24. The system of claim 1, wherein a baffle is disposed within the flash vessel, and wherein the baffle is configured to evenly distribute the first flash gas across the flash vessel by preventing the first fluid from impinging on the first flash gas.

* * * * *